United States Patent

Scheltus

[15] 3,666,815

[45] May 30, 1972

[54] METHOD FOR THE CATALYTIC OXIDATION OF ALKYL AROMATES

[72] Inventor: Paulus I. T. Scheltus, Noordwijk, Netherlands

[73] Assignee: Nederlandse Organisatie Voor Toegepast-Natuurweten-Schappelijk Onderzoek Ten Behoeve Van Nijverheid, Handel Er Verkeer, The Hague, Netherlands

[22] Filed: May 18, 1970

[21] Appl. No.: 38,557

[30] Foreign Application Priority Data

June 10, 1969 Netherlands.........................69/08858

[52] U.S. Cl. .......................260/592, 260/618 C, 260/610 B, 252/431

[51] Int. Cl. .................C07c 49/78, C07c 31/14, C07c 73/08

[58] Field of Search...........................260/592, 618 C, 610 B; 252/431

[56] References Cited

UNITED STATES PATENTS 3,073,867  1/1963  Offenhauer et al. ....................260/592

FOREIGN PATENTS OR APPLICATIONS 801,387  9/1958  Great Britain .........................260/592

*Primary Examiner*—Daniel D. Horwitz
*Attorney*—Brumbaugh, Graves, Donohue & Raymond

[57] ABSTRACT

This invention relates to the oxidation of alkyl aromatic compounds with an alkyl-substituted phthalocyanine as a catalyst and with methods for the preparation of this catalyst.

7 Claims, No Drawings

METHOD FOR THE CATALYTIC OXIDATION OF ALKYL AROMATES

The invention relates to a method for the catalytic oxidation of secondary and tertiary alkyl-aromatic compounds by means of gaseous oxygen or by means of a gas containing oxygen and is characterized in that a metal-containing phthalocyanine substituted by an isopropyl group or a tertiary butyl group is used as a catalyst for the oxidation.

The above-mentioned metal-containing phthalocyanines, substituted by an isopropyl group or a tertiary-butyl group, surprisingly are soluble in, for example, aromatic liquids.

Usually phthalocyanines are obtained, for example, by phthalic anhydride or phthalic acid being reacted with a metal or a metal salt, a catalyst and urea. The substituted phthalocyanines according to the invention can be obtained by starting from the corresponding substituted phthalic anhydride or phthalic acid.

The solubility of the catalysts according to the invention opens up the possibility of a homogeneous catalysis. The catalyst dissolves sufficiently in the aromatic compound to be oxidized, so that for this purpose no solvents need to be added. But with the aid of solvents the rate of the reaction and the composition of the product may be influenced.

Oxidizable aromatic compounds according to the invention are those which carry at least one ethyl group and/or one isopropyl group such as ethylbenzene, cumene, 1,3- and 1,4-di-isopropylbenzene and p-cymene.

Metal-containing phthalocyanine complexes and compounds derived from these complexes are known in the art. The nature of the metal ion strongly affects the rate of the reaction and the composition of the product. Highly suitable metal atoms are iron, copper, cobalt, nickel and manganese.

EXAMPLE I

Into a glass reactor of 300 ml. contents and provided with a stainless steel gas-dispersion stirrer, with a device for gas circulation, 100 ml. of cumene were brought together with 0.03 ml. of cumylhydroperoxide dissolved in cumene (80 percent concentration). The temperature was constantly kept at 30° C. by placing the whole reactor in a thermostatic bath; the whole reactor was flushed with pure $O_2$. Then 100 mg of tertiary-butyl-iron-phthalocyanine were added after a temperature equilibrium had been attained and without further opening the reaction vessel.

The reaction started immediately and its progress was checked with a gas burette that recorded the oxygen intake. The same held good if no cumylhydroperoxide had been added.

The reaction was continued until a 46 percent conversion of initial cumene was reached (after 7 hours) and the products were characterized by means of a N.M.R. analysis. The chief products were dimethylphenyl carbinol (36.5 percent) and acetophenone (6 percent). The greatest rate of reaction was 22 percent conversion of initial cumene per hour.

EXAMPLE II

The procedure of Example I was repeated but now while continuously adding cumene hydroperoxide, namely 7 percent of cumene hydroperoxide per hour with respect to the initial amount of cumene. Rates of reaction of 24–26 percent conversion of initial cumene per hour were achieved.

The reaction was continued until a 45.5 percent conversion of initial cumene was reached. Of it 38 percent was dimethylphenyl carbinol and only 4 percent acetophenone, the balance, being 3.5 percent was formed by dicumylperoxide, as in Example I.

EXAMPLE III

The procedure of Example I was repeated but now with 100 mg of tertiary butyl-copper-phthalocyanine at 70° C. A long induction period occurred, which could be entirely eliminated, however, with 0.1 mg of tertiary butylferriphthalocyanine. The reaction was continued until a 30 percent conversion of initial cumene was reached. The highest rate of reaction under these conditions was 7 percent conversion of initial cumene per hour. The chief product was cumylhydroperoxide.

EXAMPLE IV

The procedure of Example I was repeated. The gas-liquid mixture was not homogenized with a gas dispersion stirrer, however, such as in Example I, but rather with an ultrasonic stirring device (20,000 cps, 60 Ws). The rate of reaction was 30 percent conversion of initial cumene per hour. The products were dimethylphenyl carbinol, acetophenone and dicumylperoxide in the ratio 6 : 1 : 0.4.

EXAMPLE V

The procedure of Example IV was repeated, but now at 10° C. instead of 30° C. The rate of reaction was 15 percent conversion of initial cumene per hour. Chief products were dimethylphenyl carbinol, acetophenone and dicumylperoxide in a ratio of 6 : 1 : 0.6.

EXAMPLE VI

According to the procedure of Example I 100 ml. of 1,4-di-isopropylbenzene were oxidized with 100 mg of t-butyl-iron-phthalocyanine at 30° C. The maximum rate of reaction amounted to 36 percent conversion per hour, based on the equation $RH + O_2 \rightarrow ROOH$. According to N.M.R. analysis, the conversion amounted to 40 mol. %, after the reaction was finished whereas microdistillation yielded 33 percent of solid products, chiefly consisting of the monocarbinol derivative. By-product was the biscarbinol derivative. With this reaction, ketone formation is substantially less than with the oxidation of cumene. Under the same conditions 1,3-di-isopropylbenzene reacts somewhat more than twice as slowly, viz. 15 percent conversion per hour. The monocarbinol derivative was the chief product here, too.

EXAMPLE VII

In the experimental set-up according to Example I 100 ml. of cumene were oxidized with dispersed unsubstituted copper-phthalocyanine at 70° C. The rate of reaction was only 2 percent conversion per hour. The chief product was the hydroperoxide derivative.

EXAMPLE VIII

In the experimental set-up according to Example I 75 ml. of cumene were oxidized with 25 ml. of water and 100 mg of tertiary butyl-iron-phthalocyanine at 30° C. until a 32 percent conversion of initial cumene was reached. The maximum rate or reaction was 20 percent conversion per hour.

The product composition after finishing the experiment was 68 percent of cumene, 26.5 percent of dimethylphenyl carbinol, 4.2 percent of acetophenone and 13 percent of dicumylperoxide.

EXAMPLE IX

In an experimental set-up equal to that of Example VIII, now, however, while adding to the water 5 percent by weight of NaOH, at 30° C. cumene was oxidized again until a 42 percent conversion of initial cumene was achieved. Now the maximum rate of reaction was again 20 percent conversion per hour. The product composition after finishing the experiment was 58.1 percent of cumene, 34.8 percent of di-methylphenyl carbinol, 5.1 percent of acetophenone and 2 percent of dicumylperoxide.

EXAMPLE X

In an experimental set-up as for Example I at 70° C. 100 ml. of p-cymene were oxidized with 100 mg of tertiary butyl-copper-phthalocyanine until an approximately 35 percent conversion of initial p-cymene was reached. Under these conditions the chief products were p-methyl-dimethyl-phenyl-carbinol and p-methyl-cumylhydroperoxide as well as p-methylacetophenone.

EXAMPLE XI

In a set-up as according to Example I 100 ml. of cumene were oxidized at 50° C. with 100 mg of tertiary-butyl-manganese-phthalocyanine as a catalyst. The rate of reaction was 1 percent conversion per hour.

In Table A a number of observations has been taken together. Some remarks beforehand are presented below.

The degree of or percent conversion per hour, i.e., rate of reaction, is the greatest rate observed, expressed in percent of converted substrate, i.e., the alkyl aromatic compound, calculated from product analyses (P), or from the assumption: $RH + O_2 \rightarrow ROOH(A)$. In general the latter values are smaller than the real degree of conversion, because when forming a carbinol only one atom of oxygen is used; if the symbol of P,A is used, this means that both criteria were applied.

In the case of reactions with iron catalysts and manganese catalysts carbinols and ketones are chiefly or exclusively produced. In the case of iron no hydroperoxide is produced. In the case of manganese an amount of hydroperoxide is produced.

In the case of reactions with copper catalysts hydroperoxides are chiefly produced, especially at a low degree or percent conversion per hour.

Unless it is indicated otherwise, no other solvents were used besides the substrate itself, and the experiments were implemented in a reaction vessel with a gas-dispersion stirrer.

TABLE A

| No. | Phthalocyanine/ mg. | Temp., °C. | Substrate/ml. | Percent conversion per hour |
|---|---|---|---|---|
| 1 | t-Butyl Fe$^{II}$, 100 | 30 | Cumene, 100 ml. | P 22 |
| 2 | do | 30 | do | P 25 |
| 3 | do | 30 | do | P 30 |
| 4 | do | 10 | do | A 15 |
| 5 | do | 30 | Cumene, 75 ml. | A 20 |
| 6 | do | 30 | do | A 20 |
| 7 | t-Butyl Fe$^{II}$, 10 | 30 | Cumene, 10 ml. | A 30 |
| 8 | do | 50 | do | A 66 |
| 9 | do | 70 | do | A 150 |
| 10 | do | 90 | do | A 150 |
| 11 | Unsubst., nondispersed Fe$^{II}$, 10. | 30 | do | A 5.5 |
| 12 | do | 50 | do | A 26 |
| 13 | do | 70 | do | A 75 |
| 14 | do | 90 | do | A 120 |
| 15 | t-Butyl Fe$^{II}$, 100 | 30 | 1,4-diisopropyl-benzene, 100 ml. | P 36 |
| 16 | do | 30 | 1,3-diisopropyl-benzene, 100 ml. | P 15 |
| 17 | do | 80 | Ethylbenzene, 100 ml. | A 2 |
| 18 | do | 70 | do | A 1 |
| 19 | do | 80 | do | A 2½ |
| 20 | t-Butyl Mn$^{II}$, 100 | 50 | Cumene, 100 ml. | P 1 |
| 21 | t-Butyl Cu$^{II}$, 100 | 50 | do | P 1.7 |
| 21 A | do | 70 | do | A 7.0 |
| 22 | Unsubst., nondispersed Cu$^{II}$, 100. | 70 | do | A 2 |
| 23 | t-Butyl Cu$^{II}$, 100 | 85 | p-Cymene, 100 ml. | P, A 21 |
| 24 | do | 75 | do | P, A 48.5 |
| 25 | do | 70 | do | P, A 15 |
| 25-A | Unsubst., nondispersed Cu$^{II}$, 100. | 70 | do | P 2.4 |
| 26 | t-Butyl-Cu$^{II}$, 100 | 50 | do | P, A 1.7 |
| 27 | do | 70 | do | P, A 22 |
| 28 | do | 70 | do | P, A 17.5 |
| 29 | do | 70 | do | P, A 15.3 |
| 30 | t-Butyl Cu$^{II}$, 11 | 70 | do | P, A 3 |
| 31 | Isopropyl Cu$^{II}$, 10 | 70 | do | P, A 2 |

With reference to Table A some remarks can be made.

Experiment 2. Here a catalytic amount of cumene peroxide was added continuously. This is a catalyst usually employed in this art.

Experiment 3. The reaction was implemented while stirring ultrasonicly; the same applies to Experiment 4.

Experiment 5. To the substrate 25 ml. of water were added. The oxidation then took place in 100 ml. of a cumene-water emulsion; in the case of Experiment 5 there was added 25 ml. of diluted caustic soda solution (5 percent by weight of NaOH in water).

The difference between substituted and unsubstituted iron-phthalocyanine is seen when Experiments 7 and 11 are compared. The difference between substituted and unsubstituted copper-phthalocyanine is seen when Experiments 21A and 22, and 25 and 25A are compared.

In Experiments 11, 12, 13 and 14 the word "non-dispersed" is used. Particularly for the substituted iron-phthalocyanine it is preferred to use it in a very high state of division. This may be done by dissolving the ordinary product in, for instance, aprotic dimethylsulphoxide and precipitating it with protic water. Then the degree of dispersion will have increased. On comparison with Experiments 7, 8, 9 and 10 an improvement in the degree of conversion will be found.

Although dissolving of alkylated Fe(II) phthalocyanine in particular and precipitating this finely dispersed compound succeeds very well when dissolving it in aprotic solvents and precipitating it with protic ones, there are other methods, too. For example, dissolving it in sulphuric acid and pouring it out into a saturated aqueous ferrosulphate solution while ultrasonic vibration is applied. Precipitating a highly disperse catalyst may also be implemented by passing it through steam or water vapor, instead of pouring it out.

In the case of Experiments 23, 24 and 25 the effect of the reaction temperature is very striking.

In implementing Experiment 19 another 1 ml. of ethylene glycol was added.

In implementing Experiment 25 1 ml. of H$_2$O was added; in implementing Experiment 27 0.1 mole t-butyl-Cu(II) of sodium stearate plus 7 ml. of H$_2$O were added.

It was observed that in the case of Experiment 31 the ROOH : OH ratio was greater than when t-butyl-Cu(II) phthalocyanine was used.

As for the amounts of catalyst, the useful amounts are between 1 and 400 mg of the substituted metal phthalocyanine per 100 ml. of substrate, i.e., the alkyl aromatic compound. Generally, the temperatures are not critical; there is a useful temperature range between 10° and 130° C. Usually, on application of the present method, at the same P or A or P,A, temperatures are lower than with the methods known in the art.

Alkylated Fe(II) phthalocyanine, as a rule, yields a higher percent conversion than, for instance, the corresponding Cu(II)phthalocyanine. However, as noted above, when using the alkylated Fe(II) phthalocyanines, carbinols and ketones are chiefly or exclusively obtained; whereas when using the Cu(II) compounds, hydroperoxides are chiefly produced.

Passage of oxygen or air must be done such that an intimate contact is obtained with the liquid phase; therefore a rapid stirrer, suitable sprayers, high gas velocities and the like are applied. An excess of oxygen may offer advantages. Operations can be done at ambient or raised pressures.

The reaction time is in the order of 1 hour to a few hours, if a maximum conversion is the objective. Whether this is also optimum depends in particular on the question whether or not reaction products can be separated easily. If so, then a shorter period of time may be more economically suitable. Recovering the reaction products from the reaction mixture is known to those skilled in the art.

If hydroperoxides are expected, then the amount can be determined iodometrically. From a technical-scientific point of view following the course of the reaction can better be implemented by measuring the gas intake with a gas burette.

The synthesis of the alkyl-substituted metal phthalocyanines according to the invention may be accomplished by using known processes for the manufacture of phthalocyanines.

In general, these comprise fusion of a mixture of the ortho-dinitrile derivative of phthalic acid and the metal, metal salt or metal oxide, or fusion of the acid, such as phthalic acid or its anhydride, with an excess of urea and the above mentioned metal compound at 150°–250° C. for several hours.

Alternatively, an alkyl-substituted metal-, especially copper-, phthalocyanine may be prepared directly by fusion of alkyl-substituted ortho-dihalogeno benzene, for example, with the cyanide of the appropriate metal at 150°–300° C. in an autoclave. This route may be advantageous when the alkyl group contains secondary or tertiary hydrogen atoms which are susceptible to oxidation.

$Cu^{II}$-tetra-tert.-butyl phthalocyanine, per se is best prepared from tert.-butyl substituted phthalic acid with urea and $CuCl_2$. The acid can be prepared by the known oxidation of tert.-butyl-ortho-xylene with potassium permanganate or, alternatively, by the newer route of catalytic oxidation, viz., the air-oxidation of the substituted ortho-xylene with cobalt acetate in glacial acetic acid, containing an appropriate amount of acetic anhydride. Although the isopropyl analogue may be synthesized in the same manner, it should be clear that this compound contains an active hydrogen, so that the alternative route via the ortho-dichloride and metal cyanide is more straightforward.

After completion of the reaction the purification of the alkyl-substituted phthalocyanines is different in principle from that of the unsubstituted phthalocyanines, or of those substituted metal phthalocyanines which have the same solubility characteristics, such as the tetra-naphth-tetraza metal porphyrins and the like.

$Metal^{II}$-tetra-tertiary-butyl phthalocyanines, in which the metal is $Cu^{II}$, $Co^{II}$, $Fe^{II}$, $Mn^{II}$, and $Ni^{II}$ have been prepared in the manner as described for $Cu^{II}$-tetra-tert.-butyl phthalocyanine. The time required for completion of the reaction is different for each metal, and this is generally longer for $Co^{II}$, $Fe^{II}$, $Mn^{II}$ and $Ni^{II}$ than for $Cu^{II}$.

EXAMPLE XII

The synthesis of $Cu^{II}$-tetra-tertiary-butyl phthalocyanine 45.2 g (0.204 mole) tertiary-butyl phthalic acid, 156 g (2.6 mole) urea, 7.6 g (0.44 mole) $CuCl_2 \cdot H_2O$ and 0.228 g (0.184 mole) ammonium para-molybdate, containing four molecules of water are heated on an oil bath in a three-necked flask, fitted with an air-condenser, stirrer and an inlet tube to allow an inert gas to be passed over the reaction mixture if so required.

The temperature is brought to 175° C. within 1.5 hrs and the heating is continued for an additional 1.5 hrs at 200° C. The green-black reaction mass is then boiled up with 200 ml. 1 N HCl, cooled, filtered and washed repeatedly with distilled water. The solid is then transferred to a hotler flask and treated repeatedly with small portions of 1 M NaOH until free of chloride ion. The solid is then freed of the excess of NaOH by intensive washing with distilled water and dried over $P_2O_5$.

This purification procedure may be extended or shortened as required. The semipure product, 52 grams, is then dissolved in benzene. The solution is filtered and allowed to percolate through a bed of activated alumina. After washing the filter-bed with benzene and combining the eluens with the washings, the resulting solution is concentrated to 200 ml. by flash evaporation. The $Cu^{II}$-tetra-tertiary-butyl phthalocyanine is then precipitated with an excess of methanol, if it is required in a pure state.

After filtration and drying, 25 g of the pure product is obtained. (log E at 677 nm in benzene 5.423; % C: 72.0; % H: 6.0; % N: 14.2; % Cu: 7.9; Required: %C: 72.01; % H: 6.04; % N: 14.0; % Cu: 7.94.

EXAMPLE XIII

Synthesis of $Cu^{II}$-tetra-isopropyl-phthalocyanine and of $Cu^{II}$-tetra-n-nonyl phthalocyanine 0.036 moles of 4-isopropyl (or -nonyl-) 1,2-dichlorobenzene are heated with 0.091 mole CuCN and 5.15 ml. pyridine in an autoclave under nitrogen at 220° C. for 6 hrs.

The black reaction products are slurried with benzene. After filtration the benzene solutions are percolated through a bed of activated alumina. The benzene is flashed off.

An analogue procedure starting with other metal cyanides results in the formation of the corresponding phthalocyanines.

The resulting products have the characteristic absorption spectra of metalphthalocyanides and have, in oxidation reactions, a catalytic activity comparable to that of metal-tetra-tertiary-butyl phthalocyanine.

From Examples XII and XIII it appears that as many as four tertiary-butyl- or isopropyl-groups may be present in the metal phthalocyanines according to the invention. Thus the expression in the claims that the metal-containing phthalocyanines are "substituted by an isopropyl-group or a tertiary-butyl-group" is to be understood as covering polysubstitutions as well.

I claim:

1. A process for the oxidation of aromatic compounds which comprises reacting an alkyl benzene compound having at least one alkyl substituent selected from the group consisting of ethyl and isopropyl with an oxidizing agent selected from the group consisting of gaseous oxygen, air and other free oxygen containing gases in the presence of a metal-containing alkyl- substituted phthalocyanine oxidation catalyst having a $metal^{II}$ selected from the group consisting of iron, copper, cobalt, nickel and manganese and having at least one alkyl substituent selected from the group consisting of isopropyl and tertiary-butyl.

2. The process as defined by claim 1 wherein the alkyl benzene compound is ethylbenzene, cumene, 1,3-di-isopropylbenzene, 1,4-di-isopropylbenzene or para-cymene.

3. The process as defined by claim 1 wherein the metal of the oxidation catalyst is iron.

4. The process as defined by claim 1 wherein the metal of the oxidation catalyst is manganese.

5. The process as defined by claim 1 wherein the metal of the oxidation catalyst is copper.

6. The process as defined by claim 1 wherein the oxidation reaction is conducted at a temperature of from about 10° C. to about 130° C.

7. The process as defined by claim 1 wherein the amount of oxidation catalyst is from about 1 to about 400 milligrams thereof per 100 milliliters of the alkyl benzene compound.

* * * * *